United States Patent
Sterman et al.

(10) Patent No.: US 8,135,022 B2
(45) Date of Patent: Mar. 13, 2012

(54) DETECTION OF SPIT ON VOIP CALLS

(75) Inventors: Baruch Sterman, Efrat (IL); David Schwartz, Ginot Shomron (IL); Eli Katz, London (GB)

(73) Assignee: XConnect Global Networks Ltd., London (GB)

( * ) Notice: Subject to any disclaimer, the term of this patent is extended or adjusted under 35 U.S.C. 154(b) by 813 days.

(21) Appl. No.: 11/915,143

(22) PCT Filed: May 25, 2006

(86) PCT No.: PCT/IL2006/000617
§ 371 (c)(1),
(2), (4) Date: Jul. 18, 2008

(87) PCT Pub. No.: WO2006/126202
PCT Pub. Date: Nov. 30, 2006

(65) Prior Publication Data
US 2009/0067410 A1    Mar. 12, 2009

Related U.S. Application Data

(60) Provisional application No. 60/685,232, filed on May 26, 2005.

(51) Int. Cl.
*H04L 12/28* (2006.01)
(52) U.S. Cl. .................................................. 370/401
(58) Field of Classification Search .......... 370/351–356, 370/389, 392, 395.5–395.52, 400–401; 713/153, 713/155, 160, 161, 168, 170, 181
See application file for complete search history.

(56) References Cited

U.S. PATENT DOCUMENTS

| 7,587,588 | B2 * | 9/2009 | Clemmons et al. ........... 713/155 |
| 7,912,192 | B2 * | 3/2011 | Kealy et al. ............... 379/114.14 |
| 2004/0122961 | A1 | 6/2004 | Rouault |
| 2005/0141486 | A1 | 6/2005 | Gilchrist et al. |
| 2005/0259667 | A1 | 11/2005 | Vinokurov et al. |
| 2005/0281284 | A1 | 12/2005 | Shim et al. |
| 2006/0182029 | A1 | 8/2006 | Kealy et al. |

(Continued)

FOREIGN PATENT DOCUMENTS

JP          530194 A       2/1993

(Continued)

OTHER PUBLICATIONS

Srivastava et al (Preventing Spam for SIP-based Instant Messaging and Session, Columbia University, 16 pages, Oct. 2004) (hereinafter "Srivastava").*

(Continued)

*Primary Examiner* — Frank Duong
(74) *Attorney, Agent, or Firm* — Kilpatrick Townsend & Stockton LLP

(57) ABSTRACT

A method for packet telephony includes receiving over a packet communication network (22) a first message originating from a first end-user (32A) in a first aggregating organization (28) to place a call to a second end-user (32D) in a second aggregating organization (30). Responsively to the first message, respective values are assigned to one or more security attributes that are indicative of a likelihood that the call is a spam call. A second message is transmitted over the packet communication network toward the second end-user, the second message containing at least one of the respective values that was assigned to at least one of the security attributes.

35 Claims, 3 Drawing Sheets

U.S. PATENT DOCUMENTS

2006/0187900 A1  8/2006  Akbar

FOREIGN PATENT DOCUMENTS

| | | |
|---|---|---|
| JP | 10257177 A | 9/1998 |
| JP | 10285307 A | 10/1998 |
| JP | 200318324 A | 1/2003 |
| JP | 2003242090 A | 8/2003 |
| JP | 2003333097 A | 11/2003 |
| JP | 2004206695 A | 7/2004 |
| WO | WO2004/088455 A2 | 10/2004 |
| WO | WO 2006/126196 A2 | 11/2006 |

OTHER PUBLICATIONS

Tschofenig et al (Using SAML for SIP, Internet Draft, 34 pages, Jul. 2004) (hereinafter "Tschofenig").*

Schwartz et al, SPIT (SPAM for Internet Telephony Prevention Security Model, White Paper, 29 pages, Jun. 2005.*

Rosenberg et al., "The Session Initiation Protocol (SIP) and Spam", Internet Draft, dated Feb. 13, 2005, The Internet Society (2005), pp. 1-25.

Rosenberg et al., "SIP: Session Initiation Protocol", Network Working Group Request for Comments (RFC) 3261, The Internet Society (2002), pp. 1-252.

Jennings et al., "Private Extensions to the Session Initiation Protocol (SIP) for Asserted Identity within Trusted Networks", Network Working Group Request for Comments (RFC) 3325, The Internet Society (2002), pp. 1-17.

Peterson et al., "Enhancements for Authenticated Identity Management in the Session Initiation Protocol (SIP)", Network Working Group Request for Comments (RFC) 4474, The Internet Society (2006), pp. 1-39.

Tschofenig et al., "Using SAML for SIP", draft-tschofenig-sip-saml-02.txt, Internet Draft, The Internet Society (2004), pp. 1-20.

PN505934JP Examination Report (3140759_1), Patent Application No. 2008-513008, Aug. 23, 2001.

* cited by examiner

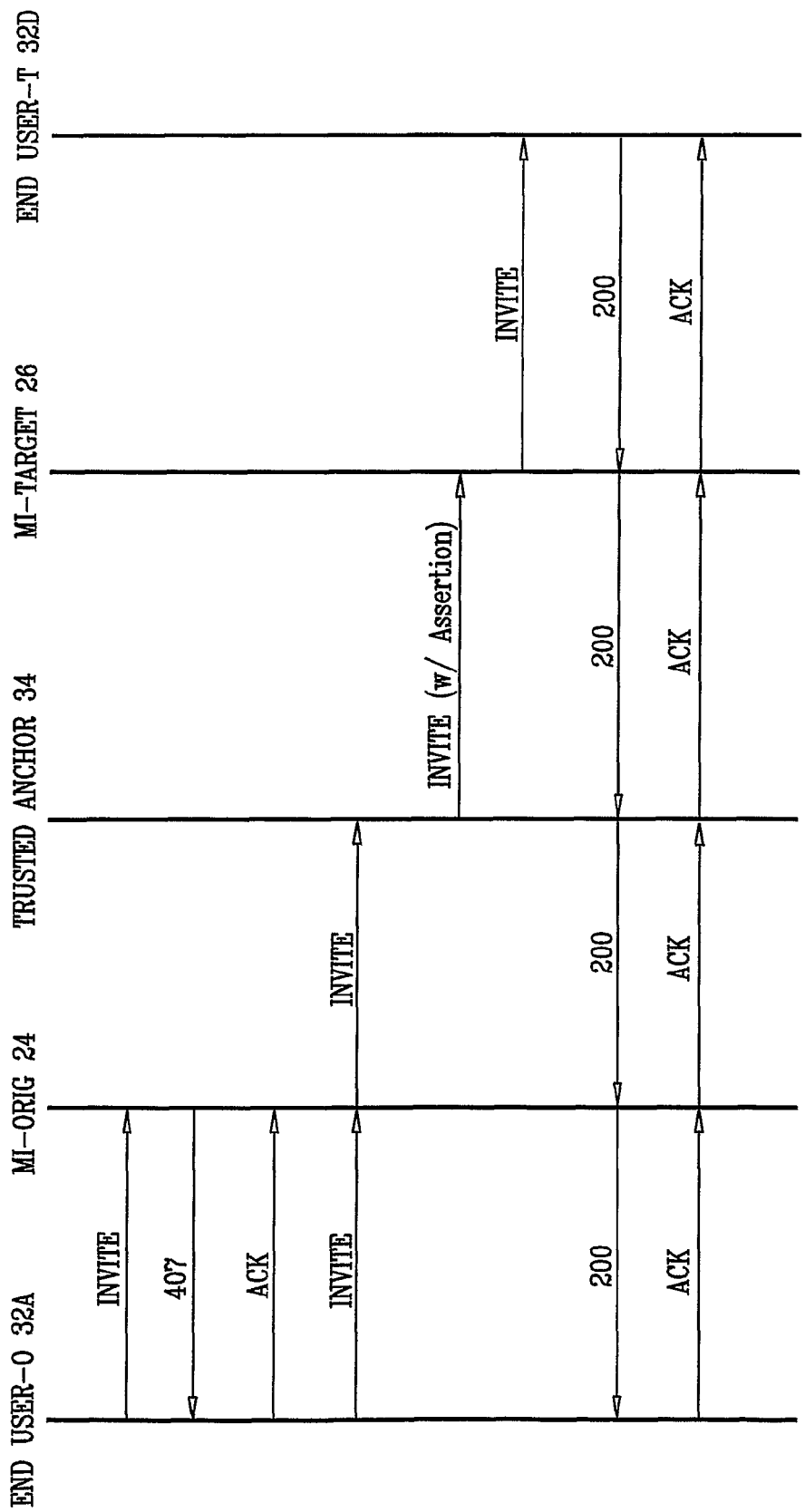

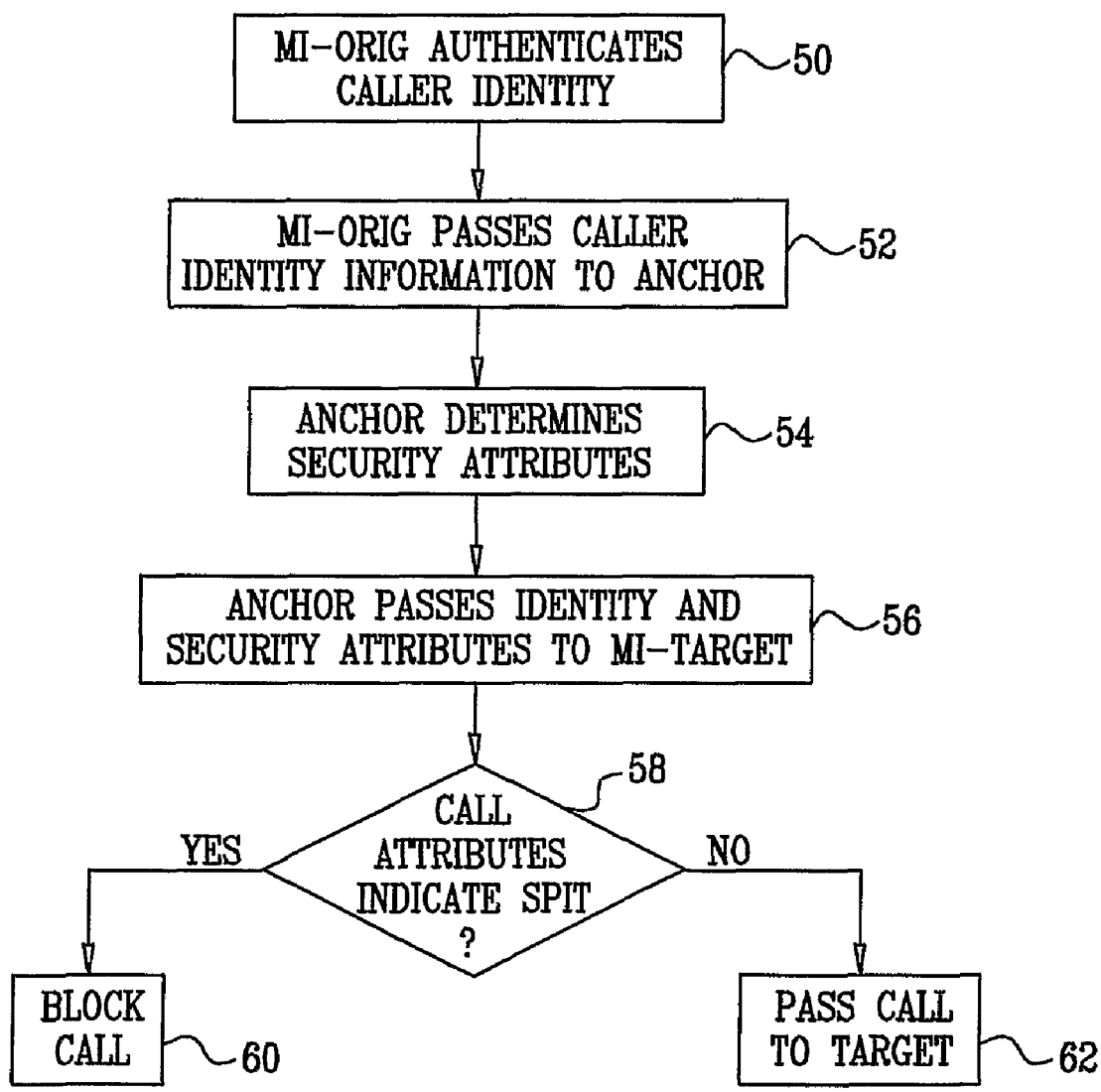

DETECTION OF SPIT ON VOIP CALLS

CROSS-REFERENCE TO RELATED APPLICATION

This application is a U.S. national phase application of PCT/IL2006/000617 filed May 25, 2006, which claims the benefit of U.S. Provisional Patent Application 60/685,232, filed May 26, 25005, which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to telephone communications, and specifically to detection and filtering of unwanted calls in a packet telephony system.

BACKGROUND OF THE INVENTION

Spam, defined as the transmission of bulk unsolicited messages, has plagued Internet e-mail. Unfortunately, spam can affect any system that enables user-to-user communications, such as Voice over Internet Protocol (VoIP) telephony. Spam transmitted over Internet telephony connections is commonly referred to as "SPIT."

Rosenberg et al. discuss SPIT-related issues in "The Session Initiation Protocol (SIP) and Spam," Internet Draft publication draft-ietf-sipping-spam-00 (Feb. 13, 2005), which is incorporated herein by reference. SIP itself is described by Rosenberg et al. in Request for Comments (RFC) 3261 of the Internet Engineering Task Force (IETF), entitled "SIP: Session Initiation Protocol" (June, 2002), which is also incorporated herein by reference. These documents, as well as other Internet drafts and RFCs cited hereinbelow, can be accessed at www.ietf.org. Rosenberg et al. explain that SIP is used for multimedia communications between users, including voice, video, instant messaging and presence. The authors predict that SIP networks will be targeted by increasing amounts of spam. They suggest a framework for anti-spam in SIP combining identity authentication, "whitelists," a "consent framework" and other techniques.

A number of authors have suggested ways in which the security of SIP networks can be enhanced. For example, Jennings et al. describe enhancements that may be made to SIP for this purpose in IETF RFC 3325, entitled "Private Extensions to the Session Initiation Protocol (SIP) for Asserted Identity within Trusted Networks" (November, 2002), which is incorporated herein by reference. This document describes private extensions to SIP that enable a network of trusted SIP servers to assert the identity of authenticated users, as well as the application of existing privacy mechanisms to the identity problem. The use of these extensions is applicable, however, only inside an administrative domain with previously agreed-upon policies for generation, transport and use of such information. Jennings et al. note that they do not offer a general privacy or identity model suitable for use between different trust domains, or for use in the Internet at large.

Peterson et al. describe a mechanism for securely identifying originators of ISP messages in Internet Draft publication draft-ietf-sip-identity-04, entitled "Enhancements for Authenticated Identity Management in the Session Initiation Protocol (SIP)" (February, 2005), which is incorporated herein by reference. This document recommends practices and conventions for identifying end-users in SIP messages, and proposes a way to distribute cryptographically-secure authenticated identities. The authors describe a mediated authentication architecture for SIP, in which requests are sent to a server in the user's local domain, which authenticates such requests. Once a message has been authenticated, the local domain then informs other SIP entities that the sending user has been authenticated and has been authorized to use the From header field. This draft specifies a means of sharing a cryptographic assurance of end-user SIP identity in an inter-domain context, which is based on the concept of an "authentication service" and new SIP headers: Identity and Identity-Info.

Tschofenig et al. describe the use of a Security Assertion Markup Language (SAML) to offer trait-based authorization for SIP, in Internet Draft document draft-tschofenig-sip-saml-02, entitled "Using SAML for SIP" (November, 2004), which is incorporated herein by reference. In trait-based authorization, users are authenticated using roles or traits instead of identity. SAML is an extension of XML for security information exchange. This document defines how SAML assertions are carried in SIP. An assertion is a package of information including authentication statements, attribute statements and authorization decision statements. The assertion is referenced by an artifact, which is an encoded string that servers use to look up an assertion. The source server stores the assertion temporarily. The destination server receives the artifact and uses it to pull the assertion from the source site.

The need for means to combat SPIT is emphasized by U.S. Patent Application Publication US 2005/0281284, which describes a system and method for broadcasting VoIP messages. The method uses random delays to disguise the automated nature of a messaging source, so as to defeat filtering or blocking of the messages.

SUMMARY OF THE INVENTION

Embodiments of the present invention provide methods and systems that enable more effective filtering of SPIT from packet telephony traffic. The embodiments that are described hereinbelow define new types of security attributes that may be associated with an attempt by an unknown party to initiate a packet telephone call, along with protocols for computing and attaching these attributes to call signaling. Upon receiving a request to initiate a call from an unrecognized party, the end-user to whom the call is directed (or the aggregating organization serving the end-user) may apply preset policies in order to filter the call according to the security attributes.

In some embodiments of the present invention, the security attributes are computed and attached to call signaling by a central, trusted authority (referred to herein as an "anchor"). The anchor is responsible for routing calls between end users in different "member islands," i.e., organizations that aggregate and forward packet telephony traffic, such as Internet telephony service providers or enterprises, which are affiliated for this purpose with the anchor. As the anchor conveys a request to initiate a call from one island to another, it computes the security attributes based on information that the anchor holds or can infer about the call, the caller, and the originating island. The anchor attaches the attributes to the call signaling, thus permitting the receiving island or end user to filter the call without necessarily having any specific information about the identity of the originating end user or island. The anchor thus permits enhanced filtering of SPIT calls among member islands without requiring the member islands to establish multiple peer-to-peer trust relationships or to exchange confidential end-user information with other member islands.

The embodiments described hereinbelow relate specifically to signaling of Internet telephony (VoIP) calls using SIP, and to methods for embedding certain security attributes in SIP signaling using SAML, as defined above. The principles of the present invention, however, may similarly be applied, mutatis mutandis, to other protocols and to other types of connection-based multimedia communications over packet networks. For convenience in the specification and claims of the present patent application, such multimedia communications are referred to generically as packet telephony, and the end-to-end connections used in such communications are referred to as "calls." These terms should be understood, however, to comprise not only voice communications, but also other media commonly carried over telephone networks, such as video and instant messaging.

There is therefore provided, in accordance with an embodiment of the present invention, a method for packet telephony, including:

receiving over a packet communication network a first message originating from a first end-user in a first aggregating organization to place a call to a second end-user in a second aggregating organization;

responsively to the first message, determining one or more characteristics of at least one of the first aggregating organization and the first end-user;

based on the one or more characteristics, assigning respective values to one or more security attributes that are indicative of a likelihood that the call is a spam call; and transmitting over the packet communication network a second message directed toward the second end-user, the second message containing at least one of the respective values that was assigned to at least one of the security attributes.

In a disclosed embodiment, the first and second organizations are member islands in a federation served by a trusted anchor, which routes packet telephone calls among the member islands, and the steps of the method are carried out by the trusted anchor.

In one embodiment, the call is a voice over Internet Protocol (VoIP) call, and the first, second messages are transmitted in accordance with a Session Initiation Protocol (SIP). The at least one of the respective values may be incorporated in the second message using a Security Assertion Markup Language (SAML).

Typically, the method includes determining whether to complete or to reject the call responsively to the at least one of the respective values. Determining whether to complete or to reject the call may include receiving a third message originating from at least one of the second aggregating organization and the second end-user in response to the second message, and deciding whether to complete or to reject the call responsively to the third message. In a disclosed embodiment, determining whether to complete or to reject the call includes applying a set of call filtering rules to the values of the security attributes.

In some embodiments, the one or more security attributes include at least one identity-related attribute, and determining the one or more characteristics includes assessing a reliability of identifying information provided by the first end-user to the first aggregating organization in order to determine the at least one identity-related attribute. In one embodiment, the at least one identity-related attribute includes an identity strength attribute, which is indicative of a level of difficulty encountered by the first end-user in obtaining access to a calling service provided by the first aggregating organization. Additionally or alternatively, the at least one identity-related attribute includes an authentication method attribute, which is indicative of a level of security of a method used for authenticating users of a calling service provided by the first aggregating organization. Further additionally or alternatively, the at least one identity-related attribute includes an identity assertion attribute, which is indicative of a level of difficulty encountered by the first end-user in obtaining access to a calling service provided by the first aggregating organization.

In some embodiments, the one or more security attributes include an indication of a cost of the call incurred by the first end-user. Additionally or alternatively, the one or more security attributes include a connection security attribute, which is indicative of a level of security of a network link over which the first message is transmitted. Further additionally or alternatively, the one or more security attributes include a SPIT suspect attribute, wherein determining the one or more characteristics includes evaluating a pattern of calls originating from the first end-user so as to determine a likelihood that the calls are spam calls, and setting a value of the SPIT suspect attribute responsively to the likelihood. Still further additionally or alternatively, the one or more security attributes include a call center attribute, which is indicative of operation of an outbound call center in the first aggregating organization.

In a disclosed embodiment, assigning the respective values includes computing a weighted score over a plurality of the respective values, and transmitting the second message includes incorporating the weighted score in the second message.

There is also provided, in accordance with an embodiment of the present invention, apparatus for packet telephony, including:

a memory, which is arranged to store characteristics of entities involved in a packet telephony system; and an anchor, which is coupled to the memory and is arranged to receive over a packet communication network a first message originating from a first end-user in a first aggregating organization to place a call to a second end-user in a second aggregating organization, and to determine, responsively to the first message, one or more of the characteristics of at least one of the first aggregating organization and the first end-user, and to assign, based on the one or more characteristics, respective values to one or more security attributes that are indicative of a likelihood that the call is a spam call, wherein the anchor is arranged to transmit over the packet communication network a second message directed toward the second end-user, the second message containing at least one of the respective values that was assigned to at least one of the security attributes.

There is additionally provided, in accordance with an embodiment of the present invention, a computer software product, including a computer-readable medium in which program instructions are stored, which instructions, when read by a computer, cause the computer to receive over a packet communication network a first message originating from a first end-user in a first aggregating organization to place a call to a second end-user in a second aggregating organization, and to determine, responsively to the first message, one or more of the characteristics of at least one of the first aggregating organization and the first end-user, and to assign, based on the one or more characteristics, respective values to one or more security attributes that are indicative of a likelihood that the call is a spam call, wherein the instructions cause the computer to transmit over the packet communication network a second message directed toward the second end-user, the second message containing at least one of the respective values that was assigned to at least one of the security attributes.

The present invention will be more fully understood from the following detailed description of the embodiments thereof, taken together with the drawings in which:

BRIEF DESCRIPTION OF THE DRAWINGS

FIG. 2 is a message flow diagram that schematically illustrates signaling associated with initiation of a VoIP call, in accordance with an embodiment of the present invention; and FIG. 3 is a flow chart that schematically illustrates a method for call filtering, in accordance with an embodiment of the present invention.

DETAILED DESCRIPTION OF EMBODIMENTS

System Overview

Figure 1:
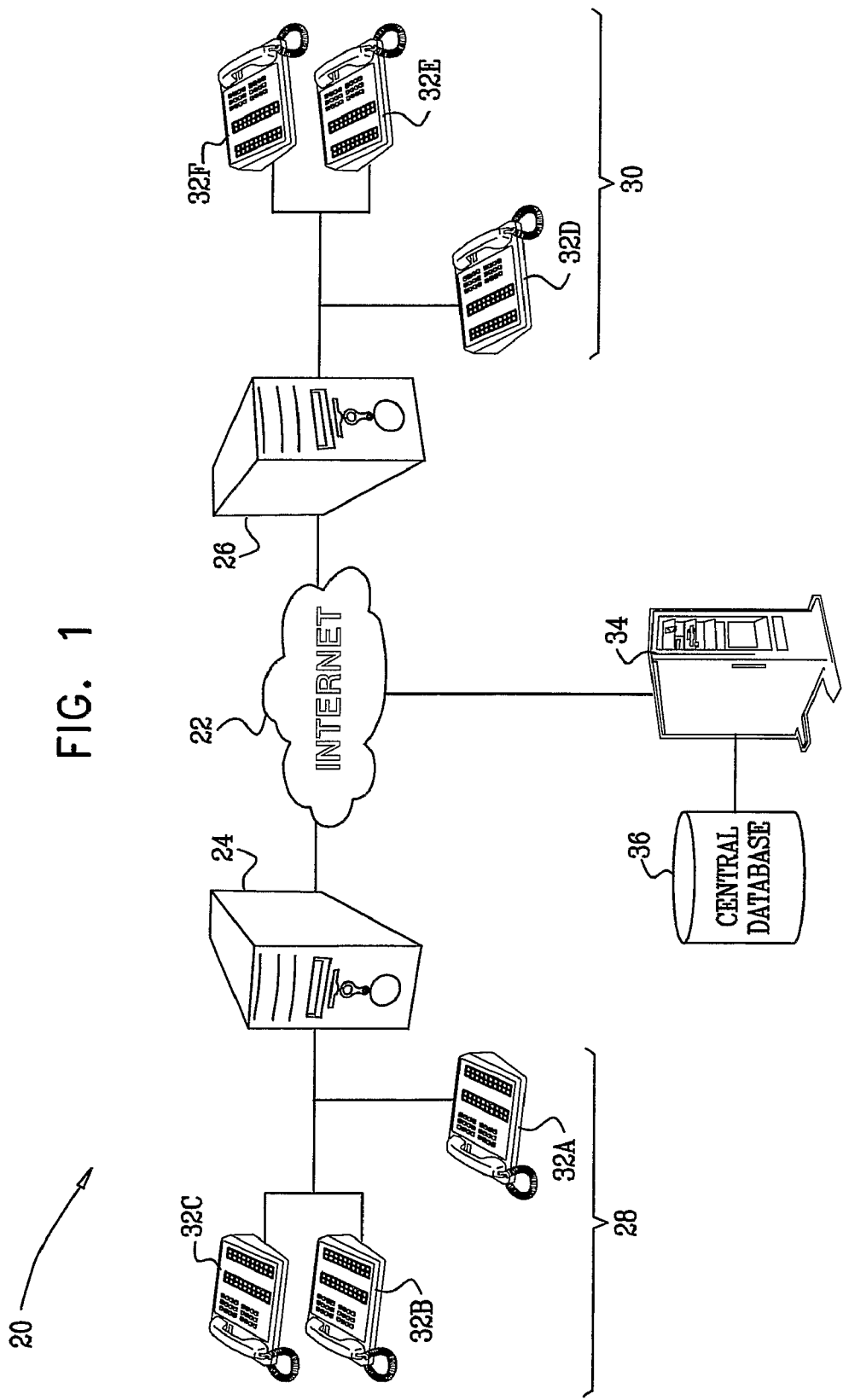
FIG. 1 is a block diagram that schematically illustrates a system for Internet telephony, in accordance with an embodiment of the present invention.

FIG. 1 is a block diagram that schematically illustrates a system 20 for Internet telephony, in accordance with an embodiment of the present invention. The system connects member islands 28 and 30 via a packet network 22, such as the public Internet. In the context of the present patent application and in the claims, an "island" refers to an organization that aggregates Internet telephony traffic among a set of end-user terminals, such as the sets of terminals 32A, 32B, 32C and 32D, 32E, 32F, . . . (which are referred to herein generically as simply terminals 32). Each terminal comprises a VoIP-enabled telephony device, such as a networked computer with an audio interface and suitable software, or a dedicated Internet telephone. Each island 28, 30 is connected to network 22 by a respective border server 24, 26, such as a SIP proxy, IP private branch exchange (PBX), or router configured as a session border controller. An individual island may comprise, for example, a group of subscriber terminals served by an Internet telephony service provider (ITSP), or an enterprise or campus VoIP network. Although only two islands 28 and 30 are shown in FIG. 1 for the sake of simplicity, the principles of the present invention may be implemented over systems comprising a large number of such islands.

Islands 28 and 30 are referred to as "member islands" because they are joined in a federation for the purpose of exchanging packet telephone calls among different islands via network 22. Calls between different member islands are routed via an anchor 34, which maintains routing and security-related information regarding entities involved in system 20 in a central database in a memory 36. (Other aspects of this sort of central routing authority and database are described in a PCT patent application entitled, "Efficient Address Caching for Packet Telephony Services," filed May 23, 2006, which is assigned to the assignee of the present patent application and whose disclosure is incorporated herein by reference.) Typically, anchor 34 comprises a computer server, which has a suitable interface to network 22, and which is programmed in software to carry out the functions described herein. This software may be downloaded to the anchor in electronic form, over the network, for example, or it may, alternatively or additionally, be provided on tangible media, such as optical, magnetic, or electronic memory media. Further alternatively or additionally, some or all of the functions of anchor 34 may be carried out by dedicated or programmable hardware elements.

This sort of federation around a central, trusted anchor is advantageous, inter alia, in that it does not require the member islands to establish trust relationships with one another or even to be able to identify the member island from which a given incoming call has originated. This kind of anonymization may be desirable, for example, in view of competition among different ITSPs for the same customer base. In order to deter hacking by malicious parties outside the federation, it is desirable that communication between the member islands and the anchor be carried over links that use hop-by-hop data integrity mechanisms, as are known in the art.

Anchor 34 is responsible for certifying and asserting relevant security information about the calling party, and for passing on that information in a standard, uniform way to the target member island in each call. The federation does not necessarily require that each member island authenticate its own end users, but it does assume that the anchor is aware of the policy (or the absence of a policy) of each member island in this regard. The anchor uses the identity of the originating member island and the identity of the calling party that is provided by the originating member island (or the absence of a valid identity), along with information regarding the security parameters and trust level of the originating member island that it maintains in memory 36, in computing security attributes for each call. The anchor passes these attributes to the target member island as part of the call signaling, without necessarily identifying the originating member island or end-user. The target member island and/or end-user can thus decide, on the basis of the security attributes in the call signaling, whether to accept or reject the call without necessarily receiving any identification of the caller or originating member island.

Additionally or alternatively, the ability of the anchor (or other signaling entity) to evaluate and assign values of security attributes need not depend solely on voluntary membership of the originating island in a federation. Rather, the anchor may determine the security attributes of a given call on the basis of information that is publicly available regarding the originating island or that may be inferred from patterns of calls that originate from a given island and/or from individual users within that island. Further additionally or alternatively, the security attributes described hereinbelow, along with the methods for determining the attribute values and encapsulating the attributes in call signaling, may be applied in non-centralized, peer-to-peer signaling between islands and/or between end-users. Moreover, although certain specific security attributes are described below by way of example, other security attributes that may be used in addition to or instead of those listed below will be apparent to those skilled in the art after reading this patent application. All such alternative system configurations, security attributes and applications of these attributes are considered to be within the scope of the present invention.

Reference is now made to FIGS. 2 and 3, which schematically illustrate a process of call setup in system 20, in accordance with an embodiment of the present invention. FIG. 2 is a message flow diagram that illustrates a typical call signaling flow, while FIG. 3 is a flow chart showing steps involved in call setup and filtering. It is assumed in this example that the call is placed from end-user terminal 32A in member island 28, to end-user terminal 32D in member island 30, via border server 24, anchor 34 and border server 26. The messages in the call flow shown in FIG. 2 are identified by the corresponding SIP message types (INVITE, 407, 200 and ACK). Details of the call flow are given below in Appendix A.

Terminal 32A places a call via its telephony service provider by sending a SIP INVITE message to server 24. The server authenticates the user, at a caller authentication step 50. In this step, Digest Authentication may be used to match the username with an associated password, for example. Alternatively or additionally, other techniques may be used for user authentication, such as access control lists and private tunnels. The server may also verify, based on information available at member island 28, that the Identity passed in the From header of the SIP message is actually associated with that username. In this manner, server 24 may assert that the Identity presented by terminal 32A is actually registered to the authenticating user, thus eliminating the possibility of identity theft, in which one user presents another user's Identity.

Server 24 then relays the call to anchor 34, at a call relay step 52. At this step, server 24 passes to the anchor the Identity value of the user placing the call, even if the caller requested that his Identity not be displayed to the called party. The server can pass the Identity information to the anchor, for example, in either the P-Asserted-Identity header or the Identity header of the SIP INVITE message that it sends to the anchor. These headers are described in the publications by Jennings et al. and Peterson et al. that are referenced above in the Background of the Invention. Usage examples of both types of headers are given in Appendix A.

Typically, anchor 34 acts as a back-to-back user agent (B2BUA) between member islands 28 and 30. It rewrites the SIP message that it received at step 52 to include information relating to security, identity, and trust, which it computes at an attribute determination step 54. The anchor determines this information using the data passed by server 24 at step 52, together with information held in memory 36 regarding the policies of the originating member island and the originating end-user. The anchor presents the security information in the form of values of security attributes, which are standardized among the parties in system 20. Exemplary security attributes include:
  IdentityStrength
  CostOfCall
  AuthenticationMethod
  IdentityAssertion
  ConnectionSecurity
  SPITSuspect
  CallCenter
  AssertionStrength
The meanings and methods of computation of these attributes are described in detail hereinbelow. Anchor 34 may compute only a subset of these attributes or a superset, including additional attributes not listed above.

Anchor 34 conveys the rewritten SIP INVITE message, including the security, identity and trust information, to server 26 of member island 30, at a message passing step 56. The message contains the security attributes computed at step 54 and the caller's identity information (if the caller did not request that his Identity be hidden). The anchor inserts the security attributes and identity information in the message in a standard format. Identity may be passed, for example, in either the P-Asserted-Identity and Privacy header tuple or the Identity and Identity-Info header tuple, as described in the publications by Jennings et al. and Peterson et al. that are referenced above.

The security attributes may be formatted, for example, as descriptor=value pairs using SAML assertions, as described in the publication by Tschofenig et al. that is cited above in the Background of the Invention. A sample of SAML code containing security attributes of this sort is presented below in Appendix B. To bind an Identity header to a SIP message, as defined in Section 10 of the publication by Peterson et al., a few selected SIP headers are used in the calculation of a hash that is included in the Identity header string. In order to bind the SAML assertions to the message they too can be included in this hash string for decoding purposes by the receiving party. To avoid the possibility of malicious tampering with the SAML message, anchor 34 may use a secure link at step 56, or server 26 may use a challenge-response mechanism upon receiving the SAML message to verify that the message was indeed sent by the anchor.

Server 26 analyzes the call attributes contained in the message from anchor 34 in order to filter out SPIT calls, at a SPIT analysis step 58. Alternatively or additionally, if an end-user device, such as terminal 32D, or other equipment (such as a firewall, not shown in the figures) between server 26 and the end-user device is configured to read and use the security attributes computed by anchor 34, SPIT analysis and filtering can take place downstream from the border server. Further alternatively or additionally, anchor 34 itself may filter out certain calls directed to member island 30 based on instructions received from the member island and/or the target end-user.

Typically, at step 58, the values of the security attributes determined at step 54 are tested against a security profile. The profile contains rules for determining the treatment of each incoming call. Calls considered to be SPIT are rejected, at a call blocking step 60. If the call is considered legitimate, server 26 passes the call signaling to the target end-user and returns a message (such as SIP 200) to anchor 34 indicating acceptance of the call, at a call completion step 62.

An exemplary profile used at step 58 might include the following rules:
  Reject call if IdentityStrength<n
  Reject call if CostOfCall<n
  Reject call if AuthenticationMethod<n
  Reject call if IdentityAssertion<n
  Reject call if ConnectionSecurity<n
  Reject call if SPITSuspect>n
  Reject call if CallCenter≠0
  Reject call if AssertionStrength<n
Additionally or alternatively, the profile could include more complex rules, that operate on combinations of values of two or more of the attributes. Optionally, the profile may provide finer-grained treatment that could depend on additional factors, such as the time of day, or specify that at least some calls suspected of being SPIT be forwarded to the end-user's voice mailbox or to some other destination. In the case of a rejected call, server 26 (or whatever other element does the rejecting) may return an appropriate rejection response to the originating member island and end-user.

In passing the call signaling to target terminal 32D at step 62, server 26 may strip off the security information if the user agent and other downstream elements do not support SAML (or whatever other means are used to convey the security information). Alternatively, as noted above, the server may pass the security information along to compatible elements downstream.

Security Attributes

The following is a description of exemplary security attributes that may be used in system 20. The attributes are formatted as descriptor=value pairs and are presented hereinbelow with a description of their meaning and utility, along with suggested values representing varying levels of security or fraud potential. These value assignments are listed solely by way of example, and alternative value scales are also within the scope of the present invention.

IdentityStrength:

This parameter relates to the relative difficulty customers or other users have in obtaining access to calling service at the originating member island, i.e., the difficulty involved in obtaining an account or end-user terminal, for example. It reflects the amount of trust that can be placed in the user's identity when a call is originated from the island in question. In the case of an ITSP, for example, a free service in which users download software based on an e-mail address would have a lower value than one in which a product with pre-assigned ID is shipped to a physical address. Calls originating from the public switched telephone network (PSTN) will also have high values, since the Caller ID associated with a call on the PSTN has a high degree of trust. It is assumed that callers with a higher value of IdentityStrength are less likely to generate SPIT calls.

The values for this parameter are:
0—Unknown
1—Free service
2—Paying service (for example, billing address or payment method verified)
3—Physical premises verified/enterprise/PSTN-based
4—Strong (cryptographic) authentication of caller identity CostOfCall:

This parameter indicates the charges associated with a call. It is assumed that paying calls are less likely to be SPIT.

The values for this parameter are:
0—Unknown
1—Free
2—Flat rate,
3—Per minute

AuthenticationMethod:

This parameter describes the method that the member island (or other authorization service) uses in order to authenticate its users.

The values for this parameter are:
0—Unknown or none
1—Basic
2—Digest
3—Another form of strong authentication (such as virtual private network or smart card)

IdentityAssertion:

This parameter describes the method used to assert the Identity. As previously noted, asserting Identity is different from authorizing a user, since one authorized user could still steal another authorized user's identity.

When anchor 34 is responsible for routing calls between member islands, it may have information that will allow it to verify that a given user does in fact belong to the domain of the originating member island. For example, if the Identity of a user is the Caller ID, and the Caller ID is the same as the direct inward dial [DID] number by which calls are routed to the user's member island, then the anchor can verify that the Caller ID belongs to the DID domain of the originating member island or determine that a call coming from a member island does not belong to the set of users in the domain of that member island. In such cases, the anchor can provide some level of assertion regarding the user's Identity even if the originating member island does not enforce any policy of cross-checking the Identity against a secure username obtained from digest authentication.

It is assumed that calls with higher values of IdentityAssertion are less likely to be SPIT calls. The values for this parameter are:
0—Violation of user space detected
1—Unknown—call presented without any Identity information (such as an anonymous call originating from the PSTN)
2—Identity asserted by the anchor based on determining that the Identity belongs to the domain of the originating member island
2—Identity asserted by the originating member island as uniquely associated with an authenticated user ConnectionSecurity:

This parameter indicates the security of the link between the originating member island and the anchor.

The values for this parameter are:
0—Unknown
1—Access list
2—Proxy authentication
3—Virtual private network (VPN)/IP Security (IPsec)
4—Transparent local area network service (TLS)

SPITSuspect:

This parameter is a score assigned to the call by the anchor, based on examining call records associated with the originating end-user to determine the likelihood of the call being SPIT. Various tests may be applied for this purpose, for example:

Number of calls per minute from one user (based on the caller identity information passed from the originating member island to the anchor at step 52)
Calls from one address to a large number of end-users
Small percentage of calls that are answered by target end-users
Small percentage of repeat numbers dialed by the user
Large number of calls of the same length
Calls to sequential destination numbers The values for this parameter are 0-9 with 9 being the most likely that the call is SPIT.

CallCenter:

In some cases in which the SPITSuspect value is a high number (due to a large number of outbound calls, for example), the user placing the calls could still be legitimate. The member island responsible for the user may verify that the user is, in fact, a commercial outbound call center (which would account for the high SPITSuspect value). To facilitate this identification, the originating member island may register the user with the anchor, so that the anchor can identify the call accordingly.

The values for this parameter are:
0—Unknown
1—Known to be a call center, but not trusted (for example, this call center may make unsolicited calls and/or may not respect Do-Not-Call databases)
2—Known to be a fully-trusted call center (for example, no unsolicited calls, and either the end-user or the member island filters calls against all available Do-Not-Call databases)

AssertionStrength:

This parameter is an overall objective weighted score that the anchor assigns to the call based on all the above values. Downstream equipment may then make less sophisticated decisions solely on the value of this parameter, in addition to or instead of using the more detailed information that is also available.

The values for this parameter are:
0—Low security level
1—Medium security level
2—High security level Since this value is an overall rating of the call, it may be the most useful for determining whether to reroute or block a call. As noted above, the determination of call disposition may be made by the terminating IP-PBX, proxy, or even the user agent. These elements may not be SAML aware, or may be located behind a firewall that strips out the SAML structure. In order to overcome these constraints, the AssertionStrength parameter by itself could be passed in the SIP headers (possibly in the Warning header), rather than embedded within a SAML message.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX A

Detailed Call Flow

The SIP code snippets in this section correspond to the message flow shown in FIG. 2. The code is based generally on information presented in the publications by Jennings et al. and Peterson et al., as listed above in the Background of the Invention.

---
INVITE from originating end-user
---
INVITE sip:+14085551212@MIO.com SIP/2.0
Via: SIP/2.0/TCP euo.MIO.com;branch=z9hG4bK-123
To: <sip:+14085551212@ MIO.com>
From: "Anonymous" <sip:anonymous@anonymous.invalid>; tag=9802748
Call-ID: 245780247857024504
CSeq: 1 INVITE
Max-Forwards: 70
Privacy: id
---

The bogus value inserted in the From header indicates that the calling entity desires anonymity.

---
407 message from server to end-user
---
SIP/2.0 407 Proxy Authorization
Via: SIP/2.0/TLS euo.MIO.com;branch=z9hG4bK-123
To: <sip:+14085551212@MIO.com>;tag=123456
From: "Anonymous" <sip:anonymous@anonymous.invalid>; tag=9802748
Call-ID: 245780247857024504
CSeq: 1 INVITE
Proxy-Authenticate: .... realm="sip.MIO.com"
ACK from end-user to server
ACK sip:+14085551212@MIO.com SIP/2.0
Via: SIP/2.0/TLS euo.MIO.com;branch=z9hG4bK-123
To: <sip:+14085551212@MIO.com>;tag=123456
From: "Anonymous" <sip:anonymous@anonymous.invalid>; tag=9802748

---
Repeat INVITE from end-user
---
INVITE sip:+14085551212@MIO.com SIP/2.0
Via: SIP/2.0/TLS euo.MIO.com;branch=z9hG4bK-123
To: <sip:+14085551212@MIO.com>
From: "Anonymous" <sip:anonymous@anonymous.invalid>; tag=9802748
Call-ID: 245780247857024504
CSeq: 2 INVITE
Max-Forwards: 70
Privacy: id
Proxy-Authorization: ... realm="sip.originatingMI.com" username="alice"
---

The Proxy-Authorization "username" tag in the last line is the first time in this example that the originating end-user provides real information about itself. In other cases this information is available in the "From" header.

---
INVITE from server to anchor
---
The following code may be used for P-Asserted-Identity:
INVITE sip:+14085551212@TA.net SIP/2.0
Via: SIP/2.0/TCP MIO.com;branch=z9hG4bK-124
Via: SIP/2.0/TLS euo.MIO.com;branch=z9hG4bK-123
To: <sip:+14085551212@MIO.com>
From: "Anonymous" <sip:anonymous@anonymous.invalid>; tag=9802748
Call-ID: 245780247857024504
CSeq: 2 INVITE
Max-Forwards: 69
P-Asserted-Identity: "Alice Andrews" <sip:alice@MIO.com>
P-Asserted-Identity: tel:+14085264000
Privacy: id
---

Although the call is anonymous, the originating member island still transfers the actual caller-ID information ("Alice Andrews" and 14085264000) to the anchor. Since the end-user requested anonymity, the server informs the anchor that this is private information and should not be passed on by adding the "Privacy" header with a value of "id".

Alternatively, the Identity header approach may be used at this step. In this case, once the member island (playing the role of an Authentication Service) is sure of the Identity of the caller (Alice), the member island calculates an Identity header for the request. The canonical string over which the identity signature will be generated is as follows:

---
sip:alice@MIO.com:sip:14085551212@MIO.com:
    245780247857024504:2 INVITE:Thu, 21 Feb 2002
    13:02:03 GMT: alice@MIO.com:v=0
o=UserA 2890844526 2890844526 IN IP4 MIO.com
s=Session SDP
c=IN IP4 MIO.com
t=0 0
m=audio 49172 RTP/AVP 0
a=rtpmap:0 PCMU/8000
---

The resulting signature (sha1WithRsaEncryption) using the private RSA key given above, with base 64 encoding, has the general form:

```
CyI4+nAkHrH3ntmaxgr01TMxTmtjP7MASwliNRdupRI1vpkXRvZX
x1ja9k0nB2sN3W+v1PDsy32MaqZi0........
.IoK8HMyY1VT7egt0kk4XrKFCHYWGClsM9CG4hq+YJZTMaSROoMU
BhikVIjnQ8ykeD6UXNOyfI=
```

The originatingMI.com authentication service of the originating member island will thus create an Identity header containing a base 64 signature string. It will also add an HTTPS URL at which its certificate is available. With these two headers added, the INVITE message from the originating server to the anchor will have the form:

```
INVITE sip:+14085551212@TA.net SIP/2.0
Via: SIP/2.0/TCP MIO.com;branch=z9hG4bK-124
Via: SBP/2.0/TLS euo.MIO.com;branch=z9hG4bK-123
To: <sip:+14085551212@MIO.com>
From: "Anonymous" <sip:anonymous@anonymous.invalid>;
tag=9802748
Call-ID: 245780247857024504
CSeq: 2 INVITE
Max-Forwards: 69
Date: Thu, 21 Feb 2002 13:02:03 GMT // Date field is MANDATORY
Contact: <sip: anonymous@MIO.com>
Identity: "CyI4+nAkHrH3ntmaxgr01TMxTmtjP7MASwliNRdup
    RI1vpkXRvZXx1ja9k0nB2sN3W+v1PDsy32MaqZi0. . . .
    . .IoK8HMyY1VT7egt0kk4 XrKFCHYWGClsM9CG4hq+YJZT
    MaSROoMUBhikVIjnQ8ykeD6UXNOyfI=="
Identity-Info: https://cert.MIO.com/cert
Content-Type: application/sdp
Content-Length: ...
v=0
o=UserA 2890844526 2890844526 IN IP4 MIO.com
s=Session SDP
c=IN IP4 MIO.com
t=0 0
m=audio 49172 RTP/AVP 0
a=rtpmap:0 PCMU/8000
```

In this model, the anchor serves as a B2BUA. Therefore, the anchor has to decode the identity information that it receives regardless of whether or not it will pass the information on to the member island MI. If the anchor does not already know the certificate of originatingMI.com, it de-references the URL provided in the Identity-Info header in order to acquire the certificate. The agent then generates the same canonical string given above, from the same headers of the SIP request. Using this canonical string, the signed digest in the Identity header, and the certificate, the anchor can verify that the given set of headers and the message body have not been modified.

INVITE from Anchor to Target Server

Other than the Identity headers (discussed below) the anchor uses the following headers in passing the SAML message containing the security attribute values it has computed to the target member island:

```
SAML-Payload: "cid:attributes*SAML@TA.net"
Content-Type: multipart/mixed; boundary=unique-boundary-1
--unique-boundary-1
Content-Type: application/sdp
Content-Length: ...
v=0
```

-continued

```
...
--unique-boundary-1
Content-ID: < attributes*SAML@TA.net>
Content-Type: application/saml+xml
Content-Length: ...
<saml:Assertion> Assertion from Appendix A
    </saml:Assertion>
--unique-boundary-1--
```

If the P-Asserted-Identity approach is taken, then the anchor uses the following code to convey the Identity information to the server:

```
INVITE sip:+14085551212@MIT.com SIP/2.0
Via: SIP/2.0/TLS TA.net;branch=z9hG4bK-123
To: <sip:+14085551212@MIO.com>
From: "Anonymous" <sip:anonymous@anonymous.invalid>;
tag=9802748
Call-ID: 1234567890123456789
CSeq: 1 INVITE
Max-Forwards: 70
Privacy: id
```

If the Identity approach is chosen, and the anchor decides to forward the end-user identity to the target member island, then the steps outlined above for sending identity from the originating member island to the anchor are repeated (using the private key associated with the anchor in place of that used by the originating MI). The Identity-Info in this case will contain the certificate belonging to the anchor.

APPENDIX B

SAML Code

As noted above, SAML is an XML-based framework for exchanging security information. While other approaches use a central certificate authority to issue certificates that guarantee secure communication from one point to another within a network, SAML permits any point in the network to assert that it knows the identity of a user or piece of data. The receiving application may decide whether to trust the assertion.

| SAML Message Structure |
|---|
| ```
<saml:Assertion
    xmlns:saml="urn:oasis:names:tc:SAML:1.0:assertion"
    MajorVersion="1" MinorVersion="1"
    AssertionID="P1YaAz/tP6U/fsw/xA+jax5TPxQ="
    Issuer="mediator.com"
    IssueInstant="2005-03-12T17:15:32.753Z">
    <saml:Conditions
        NotBefore="2005-03-12T17:10:32.753Z"
        NotOnOrAfter="2005-03-12T17:20:32.753Z"/>
    <saml:AttributeStatement>
        <saml:Subject>...</saml:Subject>
            <saml:Attribute
                AttributeName="IdentityStrength"
                    AttributeNamespace="http://ta.com">
                    <saml:AttributeValue>1</saml:AttributeValue>
            </saml:Attribute> <saml Attribute
                AttributeName=" CostOfCall"
                    AttributeNamespace="http://ta.com">
                    <saml:AttributeValue>0</saml:AttributeValue>
            </saml:Attribute> <saml:Attribute
                AttributeName="CallIDAssertion"
                    AttributeNamespace="http://ta.com">
                    <saml:AttributeValue>good</saml:AttributeValue>
            </saml:Attribute> <saml:Attribute
                AttributeName=" ConnectionSecurity"
                    AttributeNamespace="http://ta.com">
                    <saml:AttributeValue>TLS</saml:AttributeValue>
            </saml:Attribute> <saml:Attribute
                AttributeName="SPITSuspect"
                    AttributeNamespace="http://ta.com">
                    <saml:AttributeValue>true</saml:AttributeValue>
        </saml:Attribute>
    </saml:AttributeStatement>
</saml:Assertion>
``` |

The invention claimed is:

1. A method for detecting and filtering a spam communication session in a packet network, comprising:

receiving at a trusted anchor, over a packet network a first message originating from a first end-user terminal in a first aggregating organization to initiate a communication session with a second end-user in a second aggregating organization, said trusted anchor not being part of said first and second aggregating organizations and said trusted anchor being arranged to route packet communication sessions between said first and second aggregating organizations;

in response to the first message, determining at said trusted anchor one or more characteristics of at least one of the first aggregating organization, the first end-user and the first end-user terminal based on characteristics stored in memory associated with the trusted anchor, the memory storing characteristics of end-users, end-user terminals and aggregating organizations forming part of a system for holding communication sessions over said packet network;

based on the one or more characteristics, assigning at said trusted anchor respective values to one or more security attributes that are indicative of a likelihood that the communication session is a spam communication session; and transmitting from said trusted anchor over the packet network a second message directed toward the second end-user terminal, the second message containing at least one of the respective values that was assigned to at least one of the security attributes.

2. A method according to claim 1, wherein the first and second organizations are member islands served by said trusted anchor.

3. A method according to claim 1, wherein the communication session is a voice over Internet Protocol (VoIP) call, and wherein the first and second messages are transmitted in accordance with a Session Initiation Protocol (SIP).

4. A method according to claim 3, wherein the at least one of the respective values is incorporated in the second message using a Security Assertion Markup Language (SAML).

5. A method according to claim 1, and comprising determining whether to complete or to reject the communication session in response to the at least one of the respective values.

6. A method according to claim 5, wherein determining whether to complete or to reject the communication session comprises receiving a third message originating from at least one of the second aggregating organization and the second end-user in response to the second message, and deciding whether to complete or to reject the communication session responsively to the third message.

7. A method according to claim 5, wherein determining whether to complete or to reject the communication session comprises applying a set of communication session filtering rules to the value of the or each security attribute.

8. A method according to claim 1, wherein the one or more security attributes comprise at least one identity-related attribute, and wherein determining the one or more characteristics comprises assessing a reliability of identifying information provided by the first end-user terminal to the first aggregating organization in order to determine the at least one identity-related attribute.

9. A method according to claim 8, wherein the at least one identity-related attribute comprises an identity strength attribute, indicative of a level of difficulty encountered by the first end-user terminal in obtaining access to communication session service provided by the first aggregating organization.

10. A method according to claim 8, wherein the at least one identity-related attribute comprises an authentication method attribute, indicative of a level of security of a method used for authenticating user terminals of a communication session service provided by the first aggregating organization.

11. A method according to claim 8, wherein the at least one identity-related attribute comprises an identity assertion attribute, indicative of a level of difficulty encountered by the first end-user terminal in obtaining access to communication session service provided by the first aggregating organization.

12. A method according to claim 1, wherein the one or more security attributes comprise an indication of a cost of the communication session incurred by the first end-user terminal.

13. A method according to claim 1, wherein the one or more security attributes comprise a connection security attribute, which is indicative of a level of security of a network link over which the first message is transmitted.

14. A method according to claim 1, wherein the one or more security attributes comprise a SPIT suspect attribute, wherein determining the one or more characteristics comprises evaluating a pattern of communication sessions originating from the first end-user terminal so as to determine a likelihood that the communication sessions are spam communication sessions, and setting a value of the SPIT suspect attribute responsively to the likelihood.

15. A method according to claim 1, wherein the one or more security attributes comprise a call center attribute, which is indicative of operation of an outbound call center in the first aggregating organization.

16. A method according to claim 1, wherein assigning the respective values comprises computing a weighted score over a plurality of the respective values, and wherein transmitting the second message comprises incorporating the weighted score in the second message.

17. Apparatus for detecting and filtering a spam communication session over a packet network, comprising:
a memory, arranged to store characteristics of entities involved in a system for initiating communication sessions over said packet network; and
trusted anchor, coupled to the memory and arranged to receive over said packet network a first message originating from a first end-user terminal in a first aggregating organization to initiate a communication session with a second end-user terminal in a second aggregating organization, the anchor not being part of the first and second aggregating organizations, and to determine, in response to receipt of the first message, one or more of the characteristics of at least one of the first aggregating organization and the first end-user terminal, and to assign, based on the one or more characteristics, respective values to one or more security attributes that are indicative of a likelihood that the communication session is a spam communication session,
wherein the anchor is arranged to transmit over the said packet network a second message directed toward the second end-user terminal, the second message containing at least one of the respective values that was assigned to at least one of the security attributes.

18. Apparatus in accordance with claim 17, wherein the first and second organizations are member islands served by the anchor.

19. Apparatus in accordance with claim 17 or claim 18, wherein the communication session is a voice over Internet Protocol (VoIP) call, and the apparatus is operable to receive the first message in accordance with a Session Initiation Protocol and likewise operable to transmit the second message in accordance with a Session Initiation Protocol.

20. Apparatus in accordance with claim 19, and operable to incorporate said at least one of the respective values in the second message using a Security Assertion Markup Language (SAML).

21. Apparatus in accordance with claim 17, and operable to apply said at least one of the respective values in determining whether to complete or to reject the communication session.

22. Apparatus in accordance with claim 21, wherein the anchor is arranged to determine whether to complete or to reject the communication session based on a third message originating from at least one of the second aggregating organization and the second end-user terminal in response to the second message.

23. Apparatus in accordance with claim 21, and operable to apply a set of communication session filtering rules to the values of the security attributes in order to determine whether to complete or to reject the communication session.

24. Apparatus in accordance with claim 17, wherein the one or more security attributes comprise at least one identity-related attribute, which is indicative of a reliability of identifying information provided by the first end-user terminal to the first aggregating organization in order to determine the at least one identity-related attribute.

25. Apparatus in accordance with claim 24, wherein the at least one identity-related attribute comprises an identity strength attribute, which is indicative of a level of difficulty encountered by the first end-user terminal in obtaining access to a communication session service provided by the first aggregating organization.

26. Apparatus in accordance with claim 24, wherein the at least one identity-related attribute comprises an authentication apparatus attribute, which is indicative of a level of security of an apparatus used for authenticating user terminals of a communication session service provided by the first aggregating organization.

27. Apparatus in accordance with claim 24, wherein the at least one identity-related attribute comprises an identity assertion attribute, which is indicative of a level of difficulty encountered by the first end-user terminal in obtaining access to a communication session provided by the first aggregating organization.

28. Apparatus in accordance with claim 17, wherein the one or more security attributes comprise an indication of a cost of the communication session incurred by the first end-user terminal.

29. Apparatus in accordance with any one of claims 17 to 28, wherein the one or more security attributes comprise a connection security attribute, which is indicative of a level of security of a network link over which the first message is transmitted.

30. Apparatus in accordance with claim 17, wherein the one or more security attributes comprise a SPIT suspect attribute, and wherein the anchor is arranged to evaluate a pattern of communication sessions originating from the first end-user terminal so as to determine a likelihood that the communication sessions are spam communication sessions, and to set a value of the SPIT suspect attribute responsively to the likelihood.

31. Apparatus in accordance with claim 17, wherein the one or more security attributes comprise a call center attribute, which is indicative of operation of an outbound call center in the first aggregating organization.

32. Apparatus in accordance with claim 17, wherein the one or more security attributes comprise a weighted score over a plurality of the respective values, and wherein the anchor is arranged to incorporate the weighted score in the second message.

33. A computer software product, comprising a non-transitory computer-readable medium in which program instructions are stored, which instructions, when read by a computer at a trusted anchor, cause the computer to receive over a packet network a first message originating from a first end-user terminal in a first aggregating organization to initiate a communication session with a second end-user terminal in a second aggregating organization, the trusted anchor not being part of the first and second aggregating organizations, and to determine, responsively to the first message, one or more of the characteristics of at least one of the first aggregating organization and the first end-user, and to assign, based on the one or more characteristics, respective values to one or more security attributes that are indicative of a likelihood that the communication session is a spam communication session, wherein the instructions cause the computer to transmit over the packet network a second message directed toward the second end-user terminal, the second message containing at least one of the respective values that was assigned to at least one of the security attributes.

34. A non-transitory computer program carrier medium bearing computer executable instructions which, when executed by a computer of a trusted anchor perform the steps comprising:

receiving at the trusted anchor, over a packet network a first message originating from a first end-user terminal in a first aggregating organization to initiate a communication session with a second end-user in a second aggregating organization, said trusted anchor not being part of said first and second aggregating organizations and said trusted anchor being arranged to route packet communication sessions between said first and second aggregating organizations;

in response to the first message, determining at said trusted anchor one or more characteristics of at least one of the first aggregating organization, the first end-user and the first end-user terminal based on characteristics stored in memory associated with the trusted anchor, the memory storing characteristics of end-users, end-user terminals and aggregating organizations forming part of a system for holding communication sessions over said packet network;

based on the one or more characteristics, assigning at said trusted anchor respective values to one or more security attributes that are indicative of a likelihood that the communication session is a spam communication session; and transmitting from said trusted anchor over the packet network a second message directed toward the second end-user terminal, the second message containing at least one of the respective values that was assigned to at least one of the security attributes.

35. A computer program carrier in accordance with claim 34 wherein said carrier comprises a computer readable storage medium.

\* \* \* \* \*